UNITED STATES PATENT OFFICE.

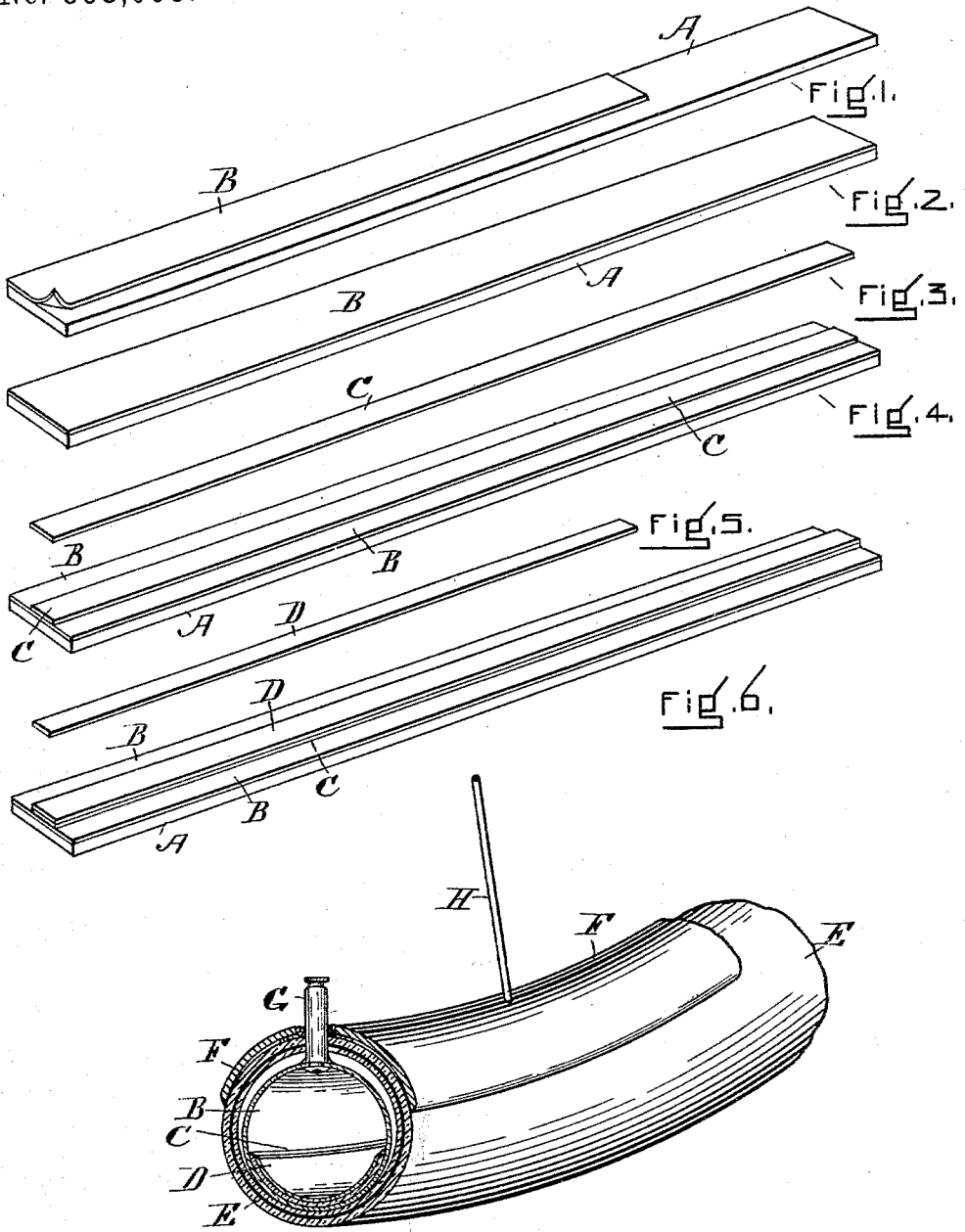

HERMON W. LADD, OF BOSTON, MASSACHUSETTS.

PROCESS OF MANUFACTURING PNEUMATIC TIRES.

SPECIFICATION forming part of Letters Patent No. 553,003, dated January 14, 1896.

Application filed April 4, 1894. Serial No. 506,293. (No model.)

*To all whom it may concern:*

Be it known that I, HERMON W. LADD, of Boston, in the county of Suffolk and State of Massachusetts, have invented certain new and useful Improvements in the Process of Manufacturing Pneumatic Tires, of which the following, taken in connection with the accompanying drawings, is a specification.

This invention is an improvement in the art of making inflatable tubes for pneumatic tires which shall not be liable to collapse by the escape of air when accidentally punctured. My improvement in the method of forming such tubes for tires results in a new and useful product—namely, a tube or tire having a three-ply tread-surface of elastic material, the middle layer of which is under compression at all times by the constriction of the layers each side of and cemented to it. These constrictive strains from without and within serve to constantly compress the intermediate layer and thus to close any small hole therein caused by an external puncture.

My improved method of forming tubes for tires of this character is briefly as follows: From a suitable sheet of vulcanized rubber I cut a piece, say, seven feet long and five inches wide. This I stretch lengthwise and crosswise upon a flat board or form and secure it thereon at its edges by tacks, clamps, or otherwise, its dimensions being then approximately ten feet by seven inches. I then coat the upper surface of the stretched sheet heavily with cement and apply centrally thereon a similar sheet of the rubber in a normal or unstretched condition, this sheet being, say, ten feet by three inches in size and coated with cement, by which it is caused to adhere firmly to the stretched sheet beneath it. I then apply along the longitudinal center of this normal sheet coated again with cement a narrower strip of the rubber—say seven feet by two inches—similarly stretched to cover ten feet by three inches. I press these layers together until the cement has hardened. Then, on removing the edge fastenings of the stretched strips, such strips contract in both directions and thereby condense or compress the intermediate layer. The edges of this three-ply sheet are then united by cement to form a tube of the proper diameter. The tube so made is then ready to be introduced into the outer casing or tire proper and its ends joined to constitute a tire of the size desired.

In the drawings, Figure 1 represents the sheet of rubber B, which is to form the outer and principal layer of rubber for the inflatable tube, lying loosely upon the board or form A, and Fig. 2 shows such sheet stretched lengthwise and crosswise to cover said board. Fig. 3 is the normal strip of rubber C, and Fig. 4 the same strip applied unstretched to the cemeted upper surface of the sheet B, which is held on the board A. Fig. 5 is the innermost strip of rubber D before being stretched and applied over the normal strip C; and Fig. 6 shows the three superposed strips B C D on the board A, the upper strip D being stretched lengthwise and crosswise to cover the cemented upper surface of the normal strip C. Fig. 7 is a perspective cross-sectional view of the wheel-rim and tire with my improved tube therein, shown partially inflated.

When the rubber strips B C D have become firmly united by the hardening of the cement they are removed from the board A and rolled up sidewise into a tube, the edges of the strip B being lapped and joined, with the narrower strips C and D on the inside. The stretched layers composing this composite tube contract and their constrictive action condenses and compacts the intermediate layer C, so that, in the event of any puncture through the three-ply portion, the strips B and D will be acting on opposite sides of the layer C to close and self-seal the opening therein, thereby preventing the escape of air and the collapse of the tire. The tube will be introduced endwise into the tire proper, E, and its ends joined or pinched down and permanently closed to retain the air.

F indicates the wheel-rim, G the inflating-tube, and H one of the spokes of the wheel.

I claim as my invention—

1. The described method of forming three-ply rubber tubes for self-sealing tires, such method consisting in stretching a suitable sheet of vulcanized rubber lengthwise and crosswise and securing it marginally in its stretched condition; then cementing the surface of such stretched sheet and applying thereon a sheet of rubber in its normal condition; then cementing such normal surface and pressing thereon another sheet or strip similarly stretched, then releasing the marginal fastenings of such stretched sheets or layers and uniting the edges of the composite sheet into a tube, substantially as set forth.

2. The described method of forming three-ply rubber pneumatic tires, such method consisting in first uniting by cement a suitable sheet or strip of vulcanized rubber in normal condition to and between two longitudinally and laterally-stretched layers of similar material, and then holding said sheets in contact until the cement hardens, afterward uniting the edges of the composite strips to form a tube and finally joining the ends of such tube to complete a hollow tire, substantially as set forth.

In testimony whereof I have signed my name to this specification in the presence of two subscribing witnesses.

HERMON W. LADD.

Witnesses:
A. H. SPENCER,
L. E. TALMADGE.